(12) United States Patent
Zhang

(10) Patent No.: US 10,814,847 B2
(45) Date of Patent: Oct. 27, 2020

(54) HYDRAULIC CONTROL VALVE BRAKE SYSTEM

(71) Applicant: Zhejiang CFMOTO Power Co., Ltd., Hangzhou, Zhejiang (CN)

(72) Inventor: Xiaolei Zhang, Hangzhou (CN)

(73) Assignee: Zhejiang CFMOTO Power Co., Ltd., Hangzhou, Zhejiang (CN)

( * ) Notice: Subject to any disclaimer, the term of this patent is extended or adjusted under 35 U.S.C. 154(b) by 36 days.

(21) Appl. No.: 15/982,107

(22) Filed: May 17, 2018

(65) Prior Publication Data
US 2019/0009759 A1 Jan. 10, 2019

(30) Foreign Application Priority Data

Jul. 6, 2017 (CN) ............... 2017 2 0814490 U

(51) Int. Cl.
B62L 3/08 (2006.01)
B60T 8/26 (2006.01)
B60T 11/34 (2006.01)
B60T 7/08 (2006.01)
B60T 7/04 (2006.01)
B60T 11/20 (2006.01)

(52) U.S. Cl.
CPC ............... *B60T 8/265* (2013.01); *B60T 7/04* (2013.01); *B60T 7/08* (2013.01); *B60T 8/261* (2013.01); *B60T 11/20* (2013.01); *B60T 11/34* (2013.01); *B62L 3/08* (2013.01)

(58) Field of Classification Search
CPC ............. B60T 8/261; B60T 8/265; B62L 3/08

USPC .................................. 303/9.64; 188/344–345
See application file for complete search history.

(56) References Cited

U.S. PATENT DOCUMENTS

| | | | | | |
|---|---|---|---|---|---|
| 3,695,732 | A | * | 10/1972 | Stelzer | B60T 8/26 303/118.1 |
| 3,743,363 | A | * | 7/1973 | Hodge | B60T 8/4095 303/115.4 |
| 4,004,839 | A | * | 1/1977 | Burgdorf | B60T 8/18 303/9.63 |
| 4,174,867 | A | * | 11/1979 | Oberthur | B60T 8/26 303/9.64 |
| 4,189,190 | A | | 2/1980 | Luepertz | |
| 4,239,294 | A | * | 12/1980 | Burgdorf | B60T 8/261 188/106 P |
| 4,465,322 | A | * | 8/1984 | Hayashi | B60T 8/261 303/115.6 |
| 5,476,162 | A | * | 12/1995 | Reed | B60T 11/16 188/344 |
| 5,501,511 | A | * | 3/1996 | Wagner | B60T 8/261 303/113.5 |

(Continued)

*Primary Examiner* — Bradley T King
(74) *Attorney, Agent, or Firm* — Jeffrey D. Shewchuk; Shewchuk IP Services, LLC

(57) ABSTRACT

A hydraulic control valve for an ATV or motorcycle takes hydraulic input from a hand brake lever as an input to a first cavity of the control valve with a movable piston therein, and from a foot brake lever as an input to a second cavity of the control valve with a movable piston therein, with the two pistons being linked. A bypass channel extends around the piston in the first cavity, which is closed off when the first piston moves longitudinally. The output of the first cavity hydraulically controls braking of the front wheel(s). The foot brake lever also pressurizes a direct line to brake the rear wheel(s) that doesn't go through the control valve.

20 Claims, 4 Drawing Sheets

(56) References Cited

U.S. PATENT DOCUMENTS

| | | | | |
|---|---|---|---|---|
| 5,971,499 A | * | 10/1999 | Pape | B62L 1/00 |
| | | | | 188/345 |
| 7,357,464 B2 | | 4/2008 | Beulich et al. | |
| 7,695,074 B2 | * | 4/2010 | Pongo | B60T 8/261 |
| | | | | 303/9.61 |

* cited by examiner

HYDRAULIC CONTROL VALVE BRAKE SYSTEM

CROSS-REFERENCE TO RELATED U.S. APPLICATION(S)

None.

FIELD OF THE INVENTION

The present invention relates to hydraulic control valves in brake systems with independent braking of front and rear wheels, primarily for use in handlebarred, straddle-type power vehicles such as motorcycles and all-terrain vehicles ("ATVs").

BACKGROUND OF THE INVENTION

Many vehicles include a braking system in which the brakes are actuated through pressure in hydraulic fluid lines, controlled by movement of a braking lever. The brakes typically include a braking caliper operating in frictional engagement with a rotating disc for each wheel being braked. When the braking lever is moved, it drives a braking pump or otherwise pressurizes the hydraulic oil in the system, pushing the pad(s) of the braking caliper against the disc. Hydraulic disc brakes have been widely used on motorcycles, ATVs and other vehicles. The hydraulic braking system needs to be flexible and reliable, and simple to operate. The hydraulic braking system should also be relatively inexpensive to manufacture, should allow for ease of maintenance, and needs to be robust for long life over years of outdoor use in various weather conditions.

Motorcycles and ATVs are straddle vehicles, which differ from cars by having a higher center of gravity, as well as usually having a shorter wheel base. When the straddle vehicle is braked, the rider's weight tends to drift forward significantly, placing more weight on the front wheel(s) than the rear wheel(s). The changing center of gravity can be worse for novice drivers than for expert drivers, particularly during unexpected braking to avoid a collision. More braking force may be needed on the front wheel to slow the front wheel at an equivalent rate to the rear wheel, particularly during heavy braking. To provide different braking forces on the front wheel(s) than on the rear wheel(s), some motorcycles and ATVs have front wheel braking systems which operate independently of the rear wheel braking system. Skilled drivers will actuate the front braking device and the rear braking device appropriately according to the road and weather conditions and desired braking deceleration, allowing the vehicle to be braked stably and reliably. However, for unskilled drivers, the traditional independently-operated front and rear brakes can result in potentially unsafe operation. Overbraking the front wheel can cause the front wheel to lock, reducing steering ability and potentially causing rollover accidents. Overbraking the rear wheel reduces the braking efficiency and can cause the rear wheel to lock, potentially causing sideslip accidents. Better braking systems are needed, particularly directed at use in handlebarred, straddle power vehicles such as motorcycles and ATVs.

BRIEF SUMMARY OF THE INVENTION

The present invention is a hydraulic control valve for a vehicle braking system, and a vehicle braking system using the hydraulic control valve. The hydraulic control valve takes hydraulic input from two sources, such as a hand brake lever and a foot brake lever, in a way which allows either the hand brake lever or the foot brake lever to brake one of the wheels, typically the front wheel(s). The other wheel(s), typically the rear wheel(s), is separately braked by only one of the hand brake lever or the foot brake lever, via a direct line that doesn't go through the control valve. In one aspect, the hydraulic line for the hand brake lever is provided as an input to a first cavity of the control valve with a movable piston therein, and the hydraulic line for the foot brake lever is provided as an input to a second cavity of the control valve with a movable piston therein, with the two pistons being linked. A bypass channel extends around the piston in the first cavity, which bypass channel is closed off when the first piston moves longitudinally.

Figure 1:
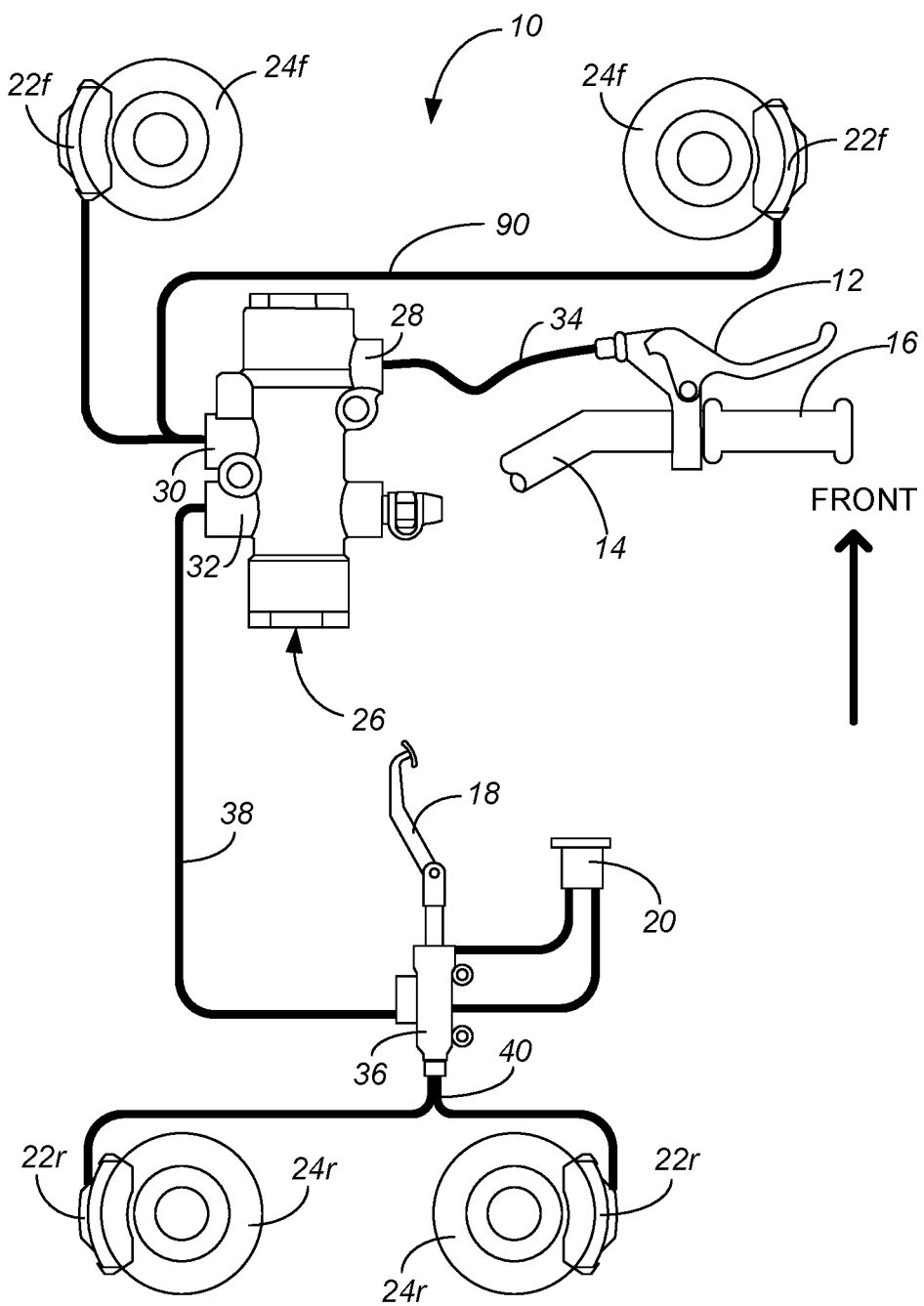
FIG. 1 is a schematic view showing the layout of a braking system in accordance with a first embodiment of the present invention.
Figure 4:
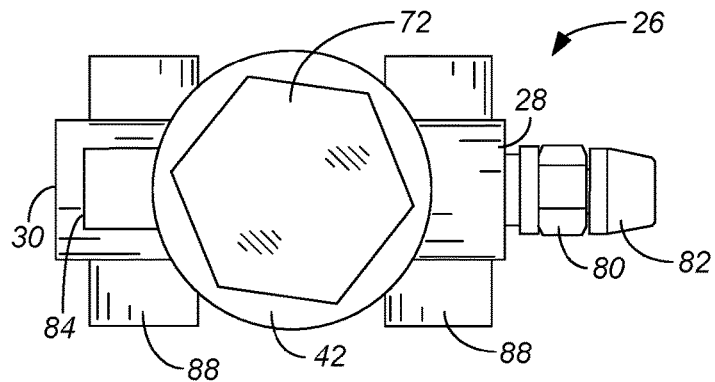
FIG. 4 is an end view of the preferred hydraulic control valve of FIGS. 2 and 3.
Figure 2:
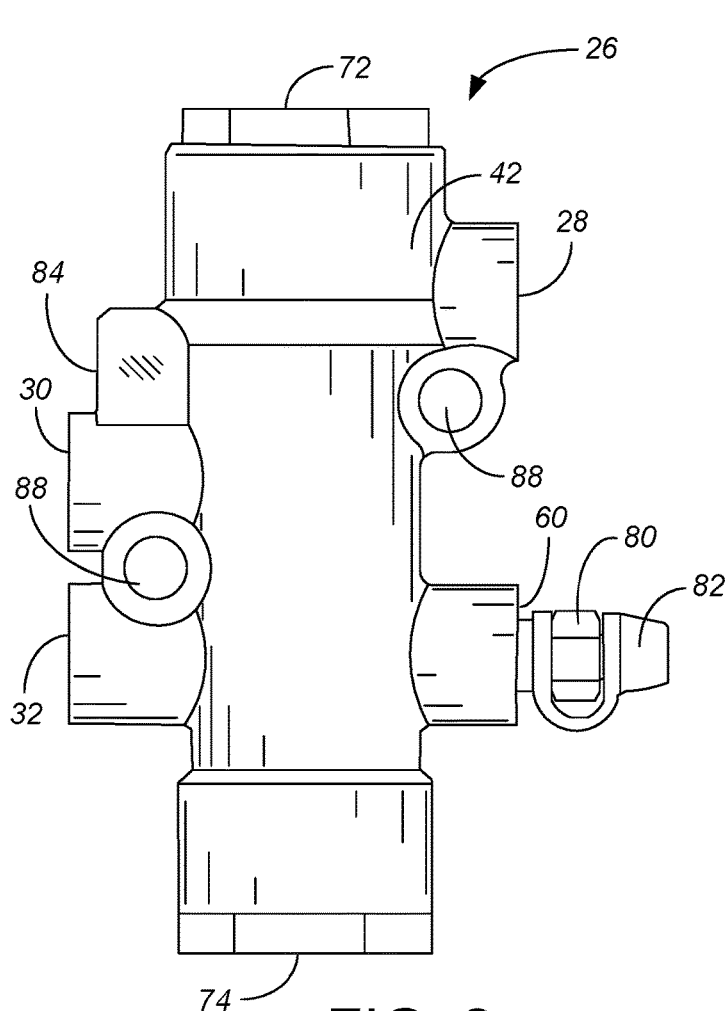
FIG. 2 is a top plan view of the preferred hydraulic control valve used in the braking system of FIG. 1.
Figure 3:
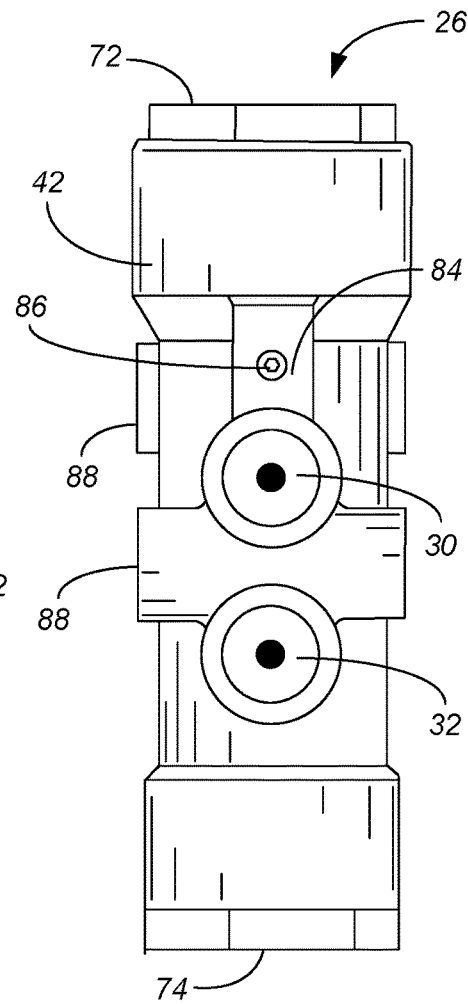
FIG. 3 is a side elevational view of the preferred hydraulic control valve of FIG. 2.

In these drawings, the reference numerals are as follows:
braking system 10;
hand brake lever 12;
handlebars 14;
hand grip 16;
foot brake lever 18;
braking fluid reservoir 20;
calipers 22;
discs 24;
control valve 26;
front input port 28;
front output port 30;
rear input port 32;
hand brake line 34;
connector 36;
rear input line 38;
rear direct line 40;
valve body 42
front piston 44;
front cavity 46;
rear piston 48;
rear cavity 50;
piston rod 52;
front piston seal 54;
rear piston seal 56;
bypass channel 58;
rear bleed port 60;
divider wall 62;
press rings 64;
seals 66;
front cavity compression spring 68;
rear cavity compression spring 70;
front end plug 72;
rear end plug 74;
front plug O-ring 76;

rear plug O-ring 78;
bleed screw 80;
bleed screw cap 82;
bypass channel machining port 84;
allen wrench plug 86;
mounting bolt holes 88; and
front brake line 90.

While the above-identified drawing figures set forth a preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

As is common in handlebarred, straddle-type power vehicles, a braking system 10 in accordance with the present invention allows independent or different braking of front wheel(s) relative to the rear wheel(s). One of the preferred inputs for the braking system 10 is a hand brake lever 12, typically mounted on the steering handlebars 14 of the vehicle adjacent a hand grip 16. The other preferred input for the braking system 10 is a foot brake lever 18. The braking system 10 operates on flow and pressure of a fluid such as hydraulic oil, and the braking system 10 includes a braking fluid reservoir 20. When the hand brake lever 12 or the foot brake lever 18 are pressed, the braking fluid causes the calipers 22 to frictionally engage the discs 24 for either the front wheel(s), the rear wheel(s) or both. While FIG. 1 shows a system 10 with two front wheels and two rear wheels such as in an ATV, the system 10 could alternatively have a single front wheel and a single rear wheel such as in a motorcycle, operating under the same principles. While FIG. 1 shows a hand brake lever 12 on a handlebar 14 and a foot brake lever 18, the inputs could be different, such as two hand brake levers or paddles or two foot brake levers or pedals, with the important consideration being that there are two separate inputs to the braking system 10 controlled by the driver of the vehicle.

As will be explained, the arrangement, front/rear vehicle orientation and front/rear control valve orientation shown in FIG. 1 is considered best for most straddle vehicle operations, providing for an intuitive and easily controlled adjustment of braking pressure on both the front and rear wheels. Alternatively, the hand brake lever 12 and the foot brake lever 18 could be reversed, with the rest of the FIG. 1 schematic unchanged. As another alternative, the control valve 26 could be mounted side-to-side on the vehicle, vertically, or with the front/rear orientation reversed. As additional alternatives, either with the hand brake lever 12 and the foot brake lever 18 as shown or with the hand brake lever 12 and the foot brake lever 18 reversed, and with the valve 26 mounted as shown or with a different mounting orientation, the front/rear orientation of the braking system 10 on the vehicle could be reversed. Because the vehicle orientation and control valve orientation shown in FIG. 1 is considered best, the terms "front" and "rear" will be used in the specification in accordance with FIG. 1. However, it should be noted that other mounting arrangements and orientations are within the scope of certain embodiments of the present invention.

The primary improvement of the present invention resides in a control valve 26 connected between the two levers 12, 18 and the brakes 22. The control valve 26 includes a front input port 28, a front output port 30 and a rear input port 32. A liquid output port of the hand brake 12 is in fluid communication with the front input port 28 of the control valve 26 through a hand brake line 34. A liquid output port of the foot brake 18 is divided such as in a connector 36 into two lines, a first line 38 to the rear input port 32 of the control valve 26, and a second direct line 40 to the rear braking caliper(s) 22r.

Figure 5:
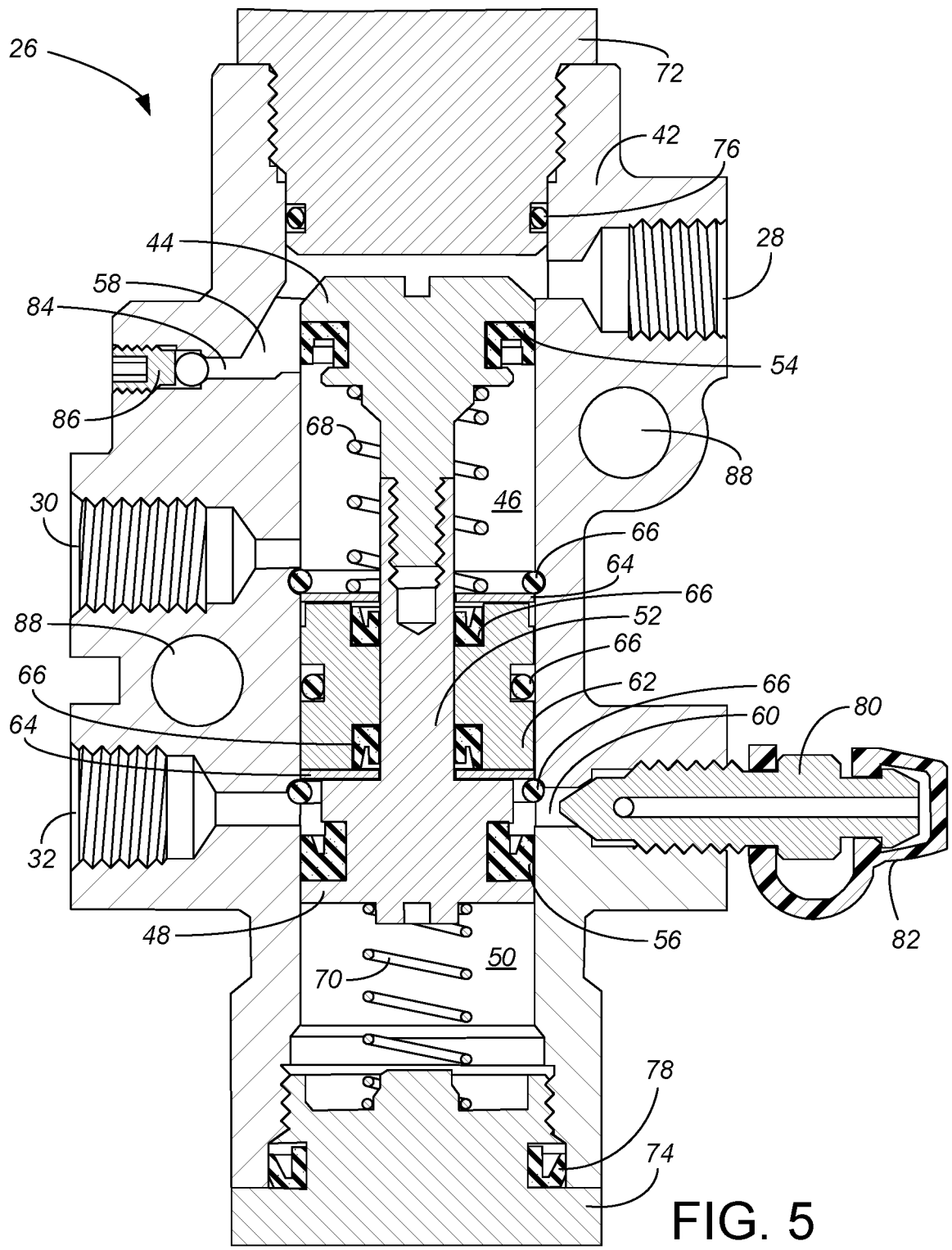
FIG. 5 is a cross-sectional plan view of the preferred hydraulic control valve of FIGS. 2-4 shown in a first normal rest position.
Figure 6:
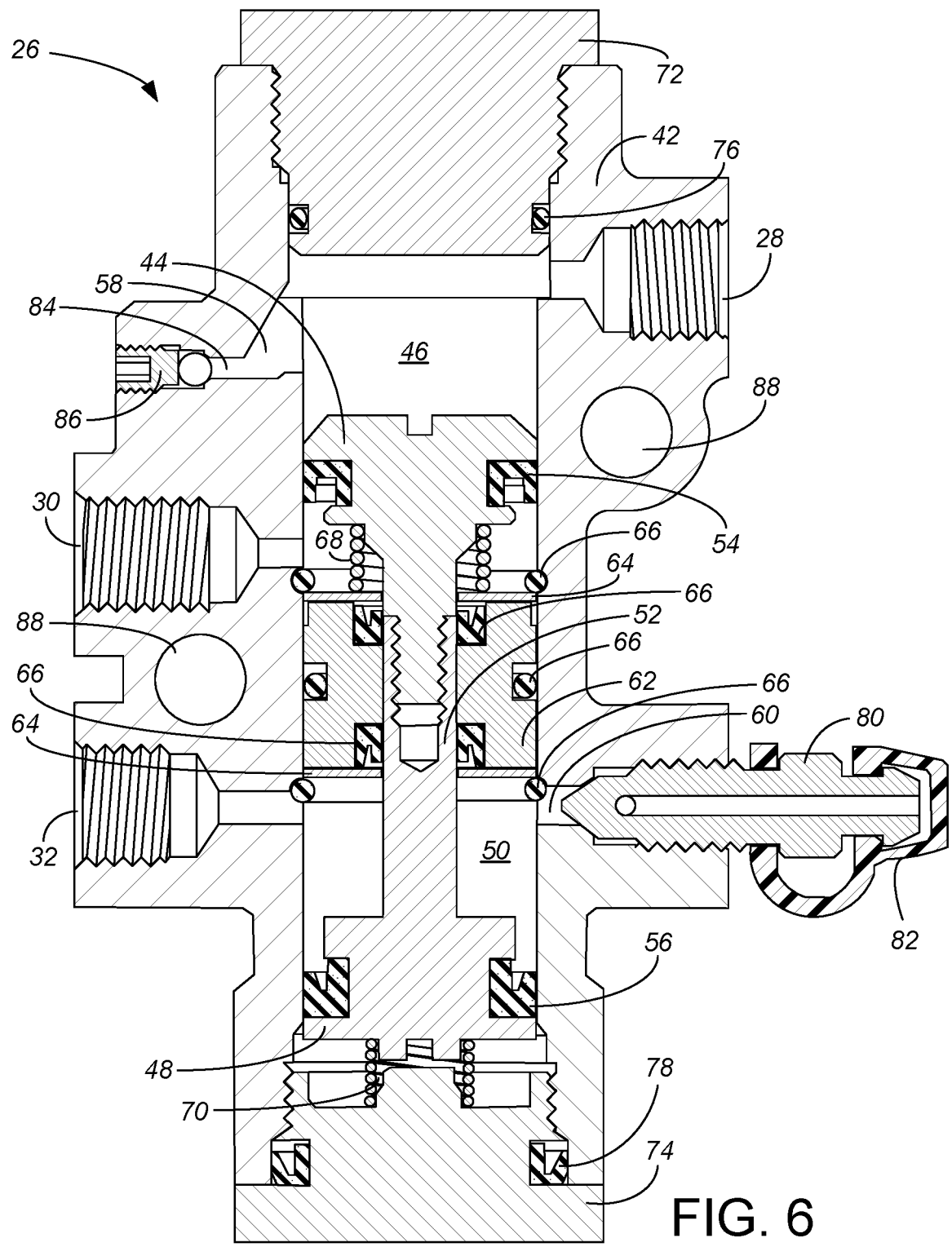
FIG. 6 is a cross-sectional plan view of the preferred hydraulic control valve of FIGS. 2-5 shown in a second position during operation of the foot brake lever.

The internal operation of the control valve 26 is best understood with reference to the cross-sectional views of FIGS. 5 and 6. The control valve 26 includes a valve body 42, with a front piston 44 which can slide longitudinally in a front cavity 46 and a rear piston 48 which can slide longitudinally in a rear cavity 50. The front piston 44 and the rear piston 48 are rigidly connected together through a piston rod 52, so the front piston 44 and the rear piston 48 move longitudinally together at the same speed and distance. Alternatively, a different linkage mechanism could be used, providing the rear piston 48 with a mechanical advantage or otherwise making it so the rear piston 48 moves the front piston 44 at a different speed or amount of movement as the rear piston 48 moves. During operation, the front cavity 46 is filled with braking fluid both forward and rearward of the front piston 44, whereas the rear cavity 50 is filled with braking fluid only forward of the rear piston 48. The front piston 44 includes a front piston seal 54 to ensure no braking fluid flow between the front piston 44 and the valve body 42 where the front piston 44 slides against the valve body 42. The rear piston 48 includes a rear piston seal 56 to ensure no flow of either braking fluid or air around the rear piston 48 where the rear piston 48 slides against the valve body 42.

A front bypass channel 58 is in the valve body 42 toward the front of the front cavity 46, extending around the front piston 44 when the front piston 44 is in the normal rest position shown in FIG. 5. However, when the front and rear pistons 44, 48 slide toward the position shown in FIG. 6, the front piston 44 closes off the front bypass channel 58, sealing off the portion of the front cavity 46 behind the front piston 44 from the flow induced by the hand brake lever 12.

In the preferred embodiment, the valve body 42 is machined with a single central longitudinal chamber from end to end, as well as the front input port 28, the front output port 30, the rear input port 32, a rear bleed port 60 and the front bypass channel 58 on the sides of the valve body 42. Other manufacturing methods and other port arrangements can be provided to result in the same effect, but the assembly method discussed below assumes the preferred machining operations to form the valve body 42.

A divider wall 62 with a central opening therethrough for the piston rod 52 is secured within the longitudinal chamber, such as through press rings 64. Washers and seals 66 are provided to ensure no braking fluid flow through the divider wall 62 during operation of the control valve 26. After the divider wall 62 is in place, a front cavity compression spring 68 is positioned in the front cavity 46, and then the front piston 44 and the rear piston 48 are rigidly secured together such as through rotational tightening of a threaded connection in the piston rod 52, with the piston rod 52 extending through the divider wall 62 and the front cavity spring 68. As will be described below, the cross-sectional areas of the piston rod 52, both where it enters the divider wall 62 from the rear cavity 50 and where it exits the divider wall 62 into the front cavity 46 (which are depicted as being equal to each other, but could alternatively differ from each other), are matters of design choice to achieve the desired braking profile of the system 10.

A rear cavity compression spring 70 is positioned in the rear cavity 50. When the valve body 42 is machined from both ends, a front end plug 72 and a rear end plug 74 can be used to close off the ends of the front and rear cavities 46, 50. The front end plug 72 includes threads so it can be rotationally tightened onto the valve body 42 to enclose the front cavity 46. A front plug ring seal or O-ring 76 is provided to ensure no leakage of braking fluid from the front cavity 46. The rear end plug 74 similarly includes threads so it can be rotationally tightened onto the valve body 42 to enclose the rear cavity 50. In the preferred embodiment, a rear plug ring seal or O-ring 78 is provided to entrap a compressible gas such as air in the space behind the rear piston 48 in the rear cavity 50. Alternatively, an air vent (not shown) could be provided in the rear side of the rear cavity 50 beyond the throw of the rear piston 48.

While the various seals 54, 56, 66, 76, 78 of the preferred embodiment are quite effective in controlling the braking fluid, some leakage of fluids may occur, particularly air migrating past the rear piston seal 56. Any air or other compressible fluid in the hydraulic system 10 tends to make the brakes sluggish and the performance spongy. In the embodiment shown, the rear bleed port 60 is provided and closed off with a bleed screw 80. The bleed screw 80 provides a primary bleeding mechanism substantially as known in bleeding hydraulic brake systems. A bleed screw cap 82 may snap on or otherwise be attached on the projecting end of the bleed screw 80. The bleed screw cap 82 is preferably attached to the bleed screw 80 such as through a flexible tie, thereby keeping the bleed screw cap 82 from being dropped when the user bleeds the rear portion of the brake system 10. For low cost manufacture and ease of use, the bleed screw cap 82 may be molded of a flexible plastic or rubber material.

In the embodiment shown, a bypass channel machining port 84 is closed off such as by an allen wrench set screw plug 86. If desired, the plug 86 can be loosened to provide a secondary bleeding mechanism for the control valve 26 and brake system 10, for bleeding the front portion of the brake system 10.

The valve body 42 preferably includes one or more mounting bolt holes 88, for receiving mounting bolts (not shown) in securing the control valve 26 relative to the vehicle. Any other convenient mounting system could alternatively be used.

How the control valve 26 operates to control the braking operation of the vehicle depends on how the lever controls 12, 18 are manipulated. The easiest operating mode to understand is when the hand brake lever 12 is gently pressed without pressing the foot brake 18. When the hand brake 12 is operated, hydraulic oil enters into the front cavity 46 through the front input port 28, flows through the bypass channel 58 and flows towards the front braking caliper 22 through the front output port 30, only braking the front wheels. As long as the applied pressure remains reasonable (i.e., gentle non-vigorous hand braking of the front wheel(s)), the front and rear pistons 44, 48 tend to be held in their rest position shown in FIG. 5, dominated by the spring force of the compression springs 68, 70. The braking pressure on the front wheel brake calipers 22$f$ is identically controlled by the gentle braking pressure applied by the hand lever 12. With the braking fluid being substantially incompressible, the distance the front wheel calipers 22$f$ move is identically controlled by the flow of brake fluid out of or back into the hand lever 12, proportional to the ratio of fluid area of the front brake lever relative to the fluid area of the front brake caliper 22$f$. The ratio of fluid area of the front brake lever 12 relative to the fluid area of the front brake caliper 22$f$ can be selected as a matter of design choice of the system 10, to provide the desired mechanical advantage and travel distance required of the front brake lever 12 as known in the art. If desired, a brake fluid pump (not shown) can be provided to increase the mechanical advantage of the system 10.

A different situation occurs whenever the foot brake lever 18 is pressed (with or without pressing the hand brake lever 12), and can also occur if the hand brake lever 12 is pressed vigorously even without pressing the foot brake 18. The front and rear pistons 44, 48 move when the forces pressing the pistons 44, 48 rearward exceed the forces pressing the pistons 44, 48 forward. The forces pressing the pistons 44, 48 rearward are: a) the pressure force of braking fluid on the front face of the front piston 44, multiplied by its area (in the embodiment shown, the full cross-sectional area of the bore); and b) the pressure force of braking fluid on the front face of the rear piston 48, multiplied by its area (in the embodiment shown, the cross-sectional area of the bore minus the cross-sectional area of the piston rod 52 where it enters the divider wall 62). The forces pressing the pistons 44, 48 forward are c) the pressure force of braking fluid on the rear face of the front piston 44, multiplied by its area (in the embodiment shown, the cross-sectional area of the bore minus the cross-sectional area of the piston rod 52 where it exits the divider wall 62); d) the pressure force of the compressible air on the rear face of the rear piston 48, multiplied by its area (in the embodiment shown, the cross-sectional area of the bore); e) the spring force of two compression springs 68, 70; and f) the momentum force needed to decelerate the mass of the front and rear pistons 44, 48 and piston rod 52 during braking (decelerating the pistons 44, 48 at the rate that the vehicle is decelerating).

The spring constants and the area differential between front and rear faces of the rear piston 48 are selected so only a minimum of rear wheel braking can occur using the foot lever 18 without also moving the pistons 44, 48 and engaging the front brakes 22$f$ as well. During most operation of the vehicle, the front brake 22$f$ can be gently braked by itself using the hand lever 12, or both front and rear wheels 22$f$, 22$r$ can be braked using the foot lever 18, alone or in combination with the hand lever 12.

Once the front piston 44 moves even a slight distance, the front piston 44 closes off the bypass channel 58, trapping the amount of brake fluid which is rearward of the front piston 44 in the front cavity 46 and in the brake line 90 to the front calipers 22$f$. After this close off of the bypass channel 58, the control valve 26 causes the braking system 10 to operate in a different way than before.

After closing off of the bypass channel 58, increasing brake pressure by further moving the foot brake lever 18 not only increases pressure on the rear calipers 22, but also moves the pistons 44, 48 further rearward by causing flow into the rear cavity 50 of the control valve 26. The rearward movement of the front piston 44 increases pressure to the front brake calipers 22 while simultaneously decreasing response pressure on the hand brake lever 12. With hands that are typically more sensitive than feet, most drivers feel the decreasing response pressure on the hand brake lever 12, and responsively tend to further move the hand brake lever 12 at the same time as they push on the foot brake lever 18. Thus, drivers that can simultaneously operate foot and hand brakes so the braking forces are appropriately divided between the front and rear wheels based on their skill level.

After closing off of the bypass channel 58, increasing brake pressure by further moving the hand brake lever 12 similarly moves the pistons 44, 48 further rearward; while rearward movement of the front piston 44 increases pressure to the front brake calipers 22, rearward movement of the rear piston 48 also decreases response pressure on the foot brake lever 18 and decreases any pressure to the rear brake calipers 22. If simultaneously using both the hand and foot levers 12, 18, novice drivers who are "handsy" are less likely to feel and respond to the decreasing foot response pressure and less likely to appropriately balance between hand and foot brake pressure. Such novice drivers 13 who are also less likely to control their center of gravity during braking—end up applying more brake pressure to the front wheel(s) 22f, as required to brake the front wheel(s) since the front wheel(s) support more of such riders' weight.

At the same time, closing off of the bypass channel 58 changes the response flow rate of the hand control 12. While the bypass channel 58 was open, the brake fluid flow rate out of the hand brake lever 12 was equal to the brake fluid flow rate into the front caliper 22f. After the bypass channel 58 closes, the brake fluid flow rate into the front caliper 22f is the change in volume in the front cavity 46 behind the front piston 44, which (due to the volume of the piston rod 52) is less than the change in volume in the front cavity 46 in front of the front piston 44. This increased travel rate of the hand brake lever 12 results in a lower likelihood of overbraking and locking up the front wheel.

Note that all of these forces a)-f) described above can be controlled by the designer of the control valve 26. For instance, the relative areas of the front and back faces of each of the front and rear pistons 44, 48 (as well as any mechanical advantage or disadvantage provided in the linkage between the rear piston 48 and the front piston 44, if the front and rear pistons 44, 48 don't move the same travel distance) can be selected as desired by the designer of the control valve 26 to achieve the desired balance between the hand brake 12 and the foot brake 18. The initial spring forces and spring constants of the springs 68, 70, as well as how far the pistons 44, 48 must move before the front piston 44 blocks the bypass channel 58, can be selected as desired by the designer of the control valve 26 to select how quickly and under what conditions the control valve 26 switches to close off the bypass channel 58. The front-back orientation of the control valve 26 can be changed, based on how the control valve 26 is mounted on the vehicle, to control whether deceleration forces (primarily based on mass of the pistons 44, 48) assist or counteract movement of the pistons 44, 48, making the switchover closing off of the bypass channel 58 more or less likely during hard braking. In the most preferred embodiment, the diameter of the bore in the valve body 42 is 19 mm, and the diameter of the piston rod 52 is 6 mm, both being cylindrical. This causes the front piston 44 to have a front face area of about 284 mm$^2$ and a rear face active area of about 255 mm$^2$, and causes the rear piston 48 to have a front face area of about 255 mm$^2$ and a rear face active area of about 284 mm$^2$. In the most preferred embodiment, the front cavity spring 68 has a spring constant of 5.9 kN/m, and the rear cavity spring 70 has a spring constant of 14.1 kN/m. In the most preferred embodiment, a complete throw of the foot lever 18 followed by a complete throw of the hand lever 12 moves the pistons 44, 48 a distance of about 5 to 7 mm, such that the volume of air behind the rear piston 48 is compressed 56 to 78% during maximum braking.

Note also that the order of braking between the hand lever 12 and the foot lever 18 affects the position of the hand lever 12 for braking engagement. If the hand lever 12 is gradually engaged first, the hand lever 12 can be significantly pressed before the pistons 44, 48 move and the bypass channel 58 is closed off. The high pressure response of the hand lever 12 will then be at the end of its throw after the foot lever 18 is engaged, with a first portion of the throw of the hand lever 12 being pressureless and inactive until the driver releases the foot lever 18. If the foot lever 18 is engaged first in a significant way, the pistons 44, 48 will move and the bypass channel 58 will be closed off before the hand lever 12 has moved at all. Then the hand lever 12 will still be fully active contributing to braking pressure throughout its throw until the driver releases the foot lever 18, rather than having a first portion of the hand brake throw which is pressureless.

In the preferred embodiment, when the driver releases pressure on both the hand lever 12 and the foot lever 18, the control valve 26 is again dominated by the compression springs 68, 70 and the air pressure on the rearward side of the rear piston 48, pushing the pistons 44, 48 back to the position shown in FIG. 5. The combination between the compression springs 68, 70 and the air pressure can be used by the designer of the control valve 26 to result in the desired resetting force curve. For instance, if the air side of the rear cavity 50 is vented to atmosphere, then the spring constants can be selected to provide a linear resetting force on the pistons 44, 48. If the compression springs 68, 70 are omitted, then it is just the air pressure on the rearward side of the rear piston 48 which resets the pistons 44, 48 back to the position shown in FIG. 5. The value of this air pressure depends upon the relative change in volume of the rear cavity 50 to the rear of the rear piston 48 which was caused when the pistons 44, 48 moved away from the rest position shown in FIG. 5. For instance, by designing the rear cavity in one shape, an 8 mm movement of the rear piston 48 could reduce this air volume by 50% (doubling the air pressure force for resetting the pistons 44, 48), while a 4 mm movement of the rear piston 48 could reduce this air volume by 25% (increasing the air pressure force for resetting the pistons 44, 48 by 33%). By designing the rear cavity in a different shape, an 8 mm movement of the rear piston 48 could reduce this air volume by 95% (increasing the air pressure force for resetting the pistons 44, 48 by a factor of 20), while a 4 mm movement of the rear piston 48 could reduce this air volume by 47.5% (increasing the pressure force for resetting the piston by 2.1 times). Because the increase in air pressure can have a geometric effect on the force resetting the pistons 44, 48 while the springs 68, 70 have a linear effect on the force for resetting the pistons 44, 48, any of a wide range of different curves of resetting force can be selected by the control valve 26 designer. While compression springs 68, 70 are shown, other types of springs such as disc springs or torsion springs could alternatively be used to place a resetting force on the pistons 44, 48. A dashpot (not shown) could also be added to adjust the rate of resetting force application.

It will also be noted that the present invention provides and incorporates two independent sets of brake oil lines, i.e. lines 34 and 90 are completely separated from lines 38 and 40. If a leak occurs somewhere in the system 10, it will only affect one portion of the system 10, i.e., any single leak cannot completely disable both the front and rear brakes 22f, 22r. By its use of two independent sets of brake oil lines, including the dividing wall 62 in the control valve 26 to achieve such separation, the present invention improves both reliability and security of the whole braking system 10, ensuring the safety of the driver.

Although the present invention has been described with reference to preferred embodiments, workers skilled in the art will recognize that changes may be made in form and detail without departing from the spirit and scope of the invention.

The invention claimed is:
1. A hydraulic control valve for a vehicle braking system, the control valve comprising:
   a valve body defining a first brake fluid cavity;
   a first piston which is longitudinally moveable within the first brake fluid cavity;
   a first input port in the valve body and accessible on an outside of the valve body for receiving brake fluid, the first input port always being in fluid communication with a first area of the first piston;
   a first output port in the valve body and accessible on an outside of the valve body for delivering brake fluid, the first output port always being in fluid communication with a second area of the first piston;
   a bypass channel for the first brake fluid cavity, the bypass channel allowing pressurized brake fluid flow from the first input port around the first piston and out the first output port when the first piston is in a first longitudinal position, the bypass channel being closed off when the first piston is in a range of second longitudinal positions, wherein the bypass channel is defined in the valve body;
   a machining port in the valve body for machining the bypass channel, the machining port being closed off by a removable plug;
   a spring providing a spring force which can bias the first piston longitudinally toward the first longitudinal position; and
   a linkage for selectively moving the first piston from the first longitudinal position to the range of second longitudinal positions against the spring force of the spring, wherein, when the first piston is within the range of second longitudinal positions with the bypass channel being closed off, either greater pressure on the first area of the first piston through the first input port and/or greater force through the linkage biases the first piston in a direction further away from the first longitudinal position.

2. The hydraulic control valve of claim 1,
   wherein the valve body defines a second cavity,
   wherein the control valve comprises:
      a second piston which is longitudinally moveable within the second cavity; and
      a second input port in the valve body and accessible on an outside of the valve body for receiving brake fluid, the second input port being in fluid communication with a first area of the second piston; and
   wherein the linkage comprises:
      a piston rod extending from the first piston through a divider wall to the second piston, such that the first and second pistons move simultaneously in a longitudinal direction against the spring force of the spring when brake fluid introduced to the second cavity through the second input port acts on the first area of the second piston.

3. The hydraulic control valve of claim 2, wherein the piston rod has a cross-sectional area where the piston rod enters the divider wall which is equal to a cross-sectional area where the piston rod exits the divider wall.

4. The hydraulic control valve of claim 2, wherein the spring biases both the first and second pistons longitudinally toward the first longitudinal position.

5. The hydraulic control valve of claim 2, wherein the first area of the first piston is larger than the first area of the second piston.

6. The hydraulic control valve of claim 2, wherein the valve body has a first end and a second end defining the longitudinal direction, and sides extending from the first end to the second end, wherein the first input port, the first output port and the second input port are disposed on the sides of the valve body.

7. A hydraulic control valve for a vehicle braking system, the control valve comprising:
   a valve body defining a first brake fluid cavity and a second cavity, wherein the first and second cavities are collinearly arranged on the same center line through the valve body, and a formed as a single through hole in the valve body, closed off by one or more plugs threadably received on the valve body;
   a first piston which is longitudinally moveable within the first brake fluid cavity;
   a first input port in the valve body and accessible on an outside of the valve body for receiving brake fluid, the first input port always being in fluid communication with a first area of the first piston;
   a first output port in the valve body and accessible on an outside of the valve body for delivering brake fluid, the first output port always being in fluid communication with a second area of the first piston;
   a bypass channel for the first brake fluid cavity, the bypass channel allowing pressurized brake fluid flow from the first input port around the first piston and out the first output port when the first piston is in a first longitudinal position, the bypass channel being closed off when the first piston is in a range of second longitudinal positions;
   a spring providing a spring force which can bias the first piston longitudinally toward the first longitudinal position;
   a second piston which is longitudinally moveable within the second cavity;
   a second input port in the valve body and accessible on an outside of the valve body for receiving brake fluid, the second input port being in fluid communication with a first area of the second piston; and
   a linkage for selectively moving the first piston from the first longitudinal position to the range of second longitudinal positions against the spring force of the spring, wherein, when the first piston is within the range of second longitudinal positions with the bypass channel being closed off, either greater pressure on the first area of the first piston through the first input port and/or greater force through the linkage biases the first piston in a direction further away from the first longitudinal position, wherein the linkage comprises:
      a piston rod extending from the first piston through a divider wall to the second piston, such that the first and second pistons move simultaneously in a longitudinal direction against the spring force of the spring when brake fluid introduced to the second cavity through the second input port acts on the first area of the second piston.

8. The hydraulic control valve of claim 7, wherein the bypass channel is defined in the valve body, and further comprising a machining port in the valve body for machining the bypass channel, the machining port being closed off by a removable plug.

9. A brake system for a vehicle, comprising:
a first braking control mountable on the vehicle for control by a driver, the first braking control pressurizing brake fluid, wherein the first braking control is a hand brake lever;
a second braking control mountable on the vehicle for separate control by the driver, the second braking control pressurizing brake fluid, a brake on a first wheel of the vehicle being in fluid communication with brake fluid pressurized by the second braking control, so the brake on the first wheel is solely controlled by the second braking control, wherein the second braking control is a foot brake lever;
a control valve mounted in the vehicle, the control valve comprising:
a valve body mounted on the vehicle;
a first input port in the valve body and accessible on an outside of the valve body, the first input port receiving brake fluid pressurized by the first braking control;
a second input port in the valve body and accessible on an outside of the valve body, the second input port receiving brake fluid pressurized by the second braking control; and
a first output port in the valve body and accessible on an outside of the valve body, the first output port output being in fluid communication with a brake on a second wheel of the vehicle, wherein the first output port can be pressurized solely through pressurization from the first braking control, can alternatively be pressurized solely through pressurization from the second braking control, and can alternatively be pressurized through pressurization from both the first and second braking controls, wherein the first output port is in a completely separate circuit than the second input port such that brake fluid received in the second input port is never output through the first output port.

10. The brake system of claim 9, wherein the control valve further comprises:
a first brake fluid cavity defined in the valve body;
a first piston which is longitudinally moveable within the first brake fluid cavity, with brake fluid through the first input port being in fluid communication with a first area of the first piston;
a second brake fluid cavity defined in the valve body; and
a second piston which is longitudinally moveable within the second brake fluid cavity, with brake fluid through the second input port being in fluid communication with a first area of the second piston, the second piston being linked to the first piston.

11. The brake system of claim 9, wherein the brake fluid pressurized by the first braking control is completely separated from the brake fluid pressurized by the second braking control.

12. A brake system for a vehicle, comprising:
a first braking control mountable on the vehicle for control by a driver, the first braking control pressurizing brake fluid;
a second braking control mountable on the vehicle for separate control by the driver, the second braking control pressurizing brake fluid, a brake on a first wheel of the vehicle being in fluid communication with brake fluid pressurized by the second braking control, so the brake on the first wheel is solely controlled by the second braking control;
a control valve mounted in the vehicle, the control valve comprising:
a valve body mounted on the vehicle;
a first input port in the valve body and accessible on an outside of the valve body, the first input port receiving brake fluid pressurized by the first braking control;
a second input port in the valve body and accessible on an outside of the valve body, the second input port receiving brake fluid pressurized by the second braking control;
a first output port in the valve body and accessible on an outside of the valve body, the first output port output being in fluid communication with a brake on a second wheel of the vehicle, wherein the first output port can be pressurized solely through pressurization from the first braking control, can alternatively be pressurized solely through pressurization from the second braking control, and can alternatively be pressurized through pressurization from both the first and second braking controls, wherein the first output port is in a completely separate circuit than the second input port such that brake fluid received in the second input port is never output through the first output port;
a first brake fluid cavity defined in the valve body;
a first piston which is longitudinally moveable within the first brake fluid cavity, with brake fluid through the first input port being in fluid communication with a first area of the first piston;
a second brake fluid cavity defined in the valve body;
a second piston which is longitudinally moveable within the second brake fluid cavity, with brake fluid through the second input port being in fluid communication with a first area of the second piston, the second piston being linked to the first piston; and
a bypass channel for the first brake fluid cavity, the bypass channel allowing brake fluid flow around the first piston when the first piston is in a first longitudinal position, the bypass channel being closed off when the first piston is in a range of second longitudinal positions.

13. The brake system of claim 12, further comprising a resetting mechanism biasing the first piston toward the first longitudinal position.

14. The brake system of claim 12, further comprising a spring biasing the first piston longitudinally toward the first longitudinal position.

15. A brake system for a vehicle, comprising:
a first braking control mountable on the vehicle for control by a driver, the first braking control pressurizing brake fluid;
a second braking control mountable on the vehicle for separate control by the driver, the second braking control pressurizing brake fluid, a brake on a first wheel of the vehicle being in fluid communication with brake fluid pressurized by the second braking control, so the brake on the first wheel is solely controlled by the second braking control, wherein the first wheel is a rear wheel of the vehicle and;
a control valve mounted in the vehicle, the control valve comprising:
a valve body mounted on the vehicle;
a first input port in the valve body and accessible on an outside of the valve body, the first input port receiving brake fluid pressurized by the first braking control;

a second input port in the valve body and accessible on an outside of the valve body, the second input port receiving brake fluid pressurized by the second braking control; and a first output port in the valve body and accessible on an outside of the valve body, the first output port output being in fluid communication with a brake on a second wheel of the vehicle, wherein the second wheel is a front wheel of the vehicle, wherein the first output port can be pressurized solely through pressurization from the first braking control, can alternatively be pressurized solely through pressurization from the second braking control, and can alternatively be pressurized through pressurization from both the first and second braking controls, wherein the first output port is in a completely separate circuit than the second input port such that brake fluid received in the second input port is never output through the first output port.

16. The brake system of claim 15, wherein the first braking control is a hand brake lever and the second braking control is a foot brake lever.

17. A hydraulic control valve for a vehicle braking system, the control valve comprising:
   a valve body defining a first brake fluid cavity and a second cavity;
   a first piston which is longitudinally moveable within the first brake fluid cavity;
   a first input port in the valve body for brake fluid in fluid communication with a first area of the first piston;
   a first output port in the valve body for brake fluid in fluid communication with a second area of the first piston;
   a bypass channel for the first brake fluid cavity, the bypass channel allowing brake fluid flow around the first piston when the first piston is in a first longitudinal position, the bypass channel being closed off when the first piston is in a second longitudinal position;
   a second piston which is longitudinally moveable within the second cavity;
   a second input port in the valve body for brake fluid in fluid communication with a first area of the second piston;
   a linkage for selectively moving the first piston from the first longitudinal position to the second longitudinal position, wherein the linkage comprises:
      a piston rod extending from the first piston through a divider wall to the second piston, such that the first and second pistons move simultaneously in a longitudinal direction when brake fluid introduced to the second cavity through the second input port acts on the first area of the second piston; and
   an enclosure in the valve body for holding a compressible fluid acting on a second area of the second piston, with compressible fluid pressure biasing the first and second pistons longitudinally toward the first longitudinal position.

18. The hydraulic control valve of claim 17, further comprising a bleed screw for bleeding the second cavity of the compressible fluid.

19. A hydraulic control valve for a vehicle braking system, the control valve comprising:
   a valve body defining a first brake fluid cavity and a second cavity;
   a first piston which is longitudinally moveable within the first brake fluid cavity;
   a first input port in the valve body and accessible on an outside of the valve body for receiving brake fluid, the first input port always being in fluid communication with a first area of the first piston;
   a first output port in the valve body and accessible on an outside of the valve body for delivering brake fluid, the first output port always being in fluid communication with a second area of the first piston;
   a bypass channel for the first brake fluid cavity, the bypass channel allowing pressurized brake fluid flow from the first input port around the first piston and out the first output port when the first piston is in a first longitudinal position, the bypass channel being closed off when the first piston is in a range of second longitudinal positions;
   a spring providing a spring force which can bias the first piston longitudinally toward the first longitudinal position;
   a second piston which is longitudinally moveable within the second cavity;
   a second input port in the valve body and accessible on an outside of the valve body for receiving brake fluid, the second input port being in fluid communication with a first area of the second piston; and
   a linkage for selectively moving the first piston from the first longitudinal position to the range of second longitudinal positions against the spring force of the spring, wherein, when the first piston is within the range of second longitudinal positions with the bypass channel being closed off, either greater pressure on the first area of the first piston through the first input port and/or greater force through the linkage biases the first piston in a direction further away from the first longitudinal position, wherein the linkage comprises:
      a piston rod extending from the first piston through a divider wall to the second piston, such that the first and second pistons move simultaneously in a longitudinal direction against the spring force of the spring when brake fluid introduced to the second cavity through the second input port acts on the first area of the second piston, wherein the piston rod comprises screw threads to rigidly attach the first piston relative to the second piston.

20. A hydraulic control valve for a vehicle braking system, the control valve comprising:
   a valve body defining a first brake fluid cavity and a second cavity;
   a first piston which is longitudinally moveable within the first brake fluid cavity;
   a first input port in the valve body and accessible on an outside of the valve body for receiving brake fluid, the first input port always being in fluid communication with a first area of the first piston;
   a first output port in the valve body and accessible on an outside of the valve body for delivering brake fluid, the first output port always being in fluid communication with a second area of the first piston;
   a bypass channel for the first brake fluid cavity, the bypass channel allowing pressurized brake fluid flow from the first input port around the first piston and out the first output port when the first piston is in a first longitudinal position, the bypass channel being closed off when the first piston is in a range of second longitudinal positions;
   a spring providing a spring force which can bias the first piston longitudinally toward the first longitudinal position;
   a second piston which is longitudinally moveable within the second cavity;

a second input port in the valve body and accessible on an outside of the valve body for receiving brake fluid, the second input port being in fluid communication with a first area of the second piston, wherein the second area of the first piston is equal to the first area of the second piston; and a linkage for selectively moving the first piston from the first longitudinal position to the range of second longitudinal positions against the spring force of the spring, wherein, when the first piston is within the range of second longitudinal positions with the bypass channel being closed off, either greater pressure on the first area of the first piston through the first input port and/or greater force through the linkage biases the first piston in a direction further away from the first longitudinal position, wherein the linkage comprises:

a piston rod extending from the first piston through a divider wall to the second piston, such that the first and second pistons move simultaneously in a longitudinal direction against the spring force of the spring when brake fluid introduced to the second cavity through the second input port acts on the first area of the second piston.

* * * * *